US012326094B2

(12) United States Patent
Purdey

(10) Patent No.: US 12,326,094 B2
(45) Date of Patent: Jun. 10, 2025

(54) COMPRESSOR SEAL SYSTEM

(71) Applicant: Cummins Ltd, London (GB)

(72) Inventor: Matthew Purdey, Huddersfield (GB)

(73) Assignee: Cummins Ltd., London (GB)

( * ) Notice: Subject to any disclaimer, the term of this patent is extended or adjusted under 35 U.S.C. 154(b) by 145 days.

(21) Appl. No.: 17/418,045

(22) PCT Filed: Dec. 23, 2019

(86) PCT No.: PCT/GB2019/053692
§ 371 (c)(1),
(2) Date: Jun. 24, 2021

(87) PCT Pub. No.: WO2020/136374
PCT Pub. Date: Jul. 2, 2020

(65) Prior Publication Data
US 2022/0065133 A1   Mar. 3, 2022

(30) Foreign Application Priority Data
Dec. 24, 2018 (GB) ..................................... 1821184

(51) Int. Cl.
*F01D 25/18* (2006.01)
*F01D 11/00* (2006.01)

(52) U.S. Cl.
CPC ............ *F01D 25/183* (2013.01); *F01D 11/00* (2013.01); *F05D 2220/30* (2013.01);
(Continued)

(58) Field of Classification Search
CPC .................................................. F01D 17/165
See application file for complete search history.

(56) References Cited

U.S. PATENT DOCUMENTS 4,095,857 A * 6/1978 Palmer .................. F01D 25/186
277/423
4,664,605 A * 5/1987 Asano .................. F04D 29/106
417/407
(Continued)

FOREIGN PATENT DOCUMENTS

CN   2670604 Y   1/2005
CN   103470315 A   12/2013
(Continued)

OTHER PUBLICATIONS

GB Search Report for GB patent application No. 1821184.7, mailed Jun. 21, 2019; 3 pages.
(Continued)

*Primary Examiner* — Kenneth Bomberg
*Assistant Examiner* — Cameron A Corday
(74) *Attorney, Agent, or Firm* — Faegre Drinker Biddle & Reath LLP

(57) ABSTRACT

A seal system for a bearing chamber (22) of a turbomachine includes the baffle element (70) encircling the axis (25) of the machine. The baffle element is formed with front surface including both a recess (73) which defines a circumferentially-extending oil-receiving channel (74), and an oil-deflecting surface (78) on a gutter (77). The channel decreases in cross-sectional area close to the oil-deflecting surface, and a circular line which is within the channel distant from the gutter, intersects with the oil-deflection surface. This forces the oil to change direction at the gutter, and urges the oil radially outward. Thus, a high rotational velocity of the body of oil may be maintained, whilst improving the drainage efficiency of the seal system at the gutter.

20 Claims, 6 Drawing Sheets

(52) U.S. Cl.
CPC ...... *F05D 2220/40* (2013.01); *F05D 2240/50* (2013.01); *F05D 2240/55* (2013.01)

(56) References Cited

U.S. PATENT DOCUMENTS

| | | | |
|---|---|---|---|
| 2012/0027569 A1 | 2/2012 | Purdey | |
| 2016/0348721 A1 | 12/2016 | Futae et al. | |
| 2017/0234213 A1 | 8/2017 | Futae et al. | |
| 2018/0266455 A1* | 9/2018 | Smith | .................... F16M 13/00 |
| 2018/0371985 A1* | 12/2018 | Nambu | ................... F01D 25/20 |

FOREIGN PATENT DOCUMENTS

| | | | |
|---|---|---|---|
| CN | 106795808 A | 5/2017 | |
| CN | 107208542 A | 9/2017 | |
| CN | 107407161 A | 11/2017 | |
| CN | 108925138 A | 11/2018 | |
| EP | 3112707 A1 | 1/2017 | |
| EP | 3249192 A1 | 11/2017 | |
| JP | H07217441 A | 8/1995 | |
| JP | 2014066233 A | 4/2014 | |

OTHER PUBLICATIONS

International Search Report and Written Opinion issued by the European Patent Office, dated Mar. 23, 2020, for International Application PCT/GB2019/053692; 12 pages.

\* cited by examiner

COMPRESSOR SEAL SYSTEM

CROSS-REFERENCE TO RELATED APPLICATIONS

The present application is a national stage application of International (PCT) Patent Application Serial No. PCT/GB2019/053692, filed on Dec. 23, 2019, which claims priority to United Kingdom Application No. 1821184.7, filed Dec. 24, 2018, the complete disclosures of which are expressly incorporated by reference herein.

FIELD OF THE DISCLOSURE

The present disclosure relates to a turbomachine, and in particular to a turbomachine having a seal system comprising a baffle element. The turbomachine may be a turbocharger or power turbine. The disclosure further relates to a baffle element for use in the turbomachine, and to a seal system for use in the turbomachine.

BACKGROUND OF THE DISCLOSURE

Turbomachines are machines that transfer energy between a rotor and a fluid. For example, a turbomachine may transfer energy from a fluid to a rotor or may transfer energy from a rotor to a fluid. Two examples of turbomachines are a power turbine, which uses the rotational energy of a rotor driven by a fluid to do useful work, for example, generating electrical power; and a compressor which uses the rotational energy of the rotor to compress a fluid.

Turbochargers are well-known turbomachines for supplying air to an inlet of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to an engine inlet manifold.

The turbocharger shaft is conventionally supported by journal and thrust bearings, including appropriate lubricating systems, located within a central bearing housing connected between the turbine and compressor wheel housings.

FIG. 1 shows a schematic cross-section through a known turbocharger. The turbocharger comprises a turbine 1 joined to a compressor 2 via a central bearing housing 3. The turbine 1 comprises a turbine wheel 4 for rotation within a turbine housing 5. Similarly, the compressor 2 comprises a compressor wheel 6 which can rotate within a compressor housing 7. The compressor housing 7 defines a compressor chamber within which the compressor wheel 6 can rotate. The turbine wheel 4 and compressor wheel 6 are mounted on opposite ends of a common turbocharger shaft 8 which extends through the central bearing housing 3.

The turbine housing 5 has at least one exhaust gas inlet volute 9 (in FIG. 1 two volutes are shown) located annularly around the turbine wheel 4, and an axial exhaust gas outlet 10. The compressor housing 7 has an axial air intake passage 11 and a volute 12 arranged annularly around the compressor chamber. The volute 12 is in gas flow communication with a compressor outlet 13.

The bearing housing 3 defines a bearing chamber 22 through which the turbocharger shaft 8 passes. The shaft 8 is rotatably supported by a bearing assembly which comprises two journal bearings 14 and 15 housed towards the turbine end and compressor end respectively of the bearing housing 3. The bearing assembly further includes a thrust bearing 16 which interacts with an oil seal assembly including an oil slinger 17. Oil is supplied to the bearing assembly from the oil system of the internal combustion engine via oil inlet 18 and is fed to the bearings 14, 15, 16 by oil passageways 19. The oil fed to the bearings 14, 15, 16 may be used to both lubricate the bearings and to remove heat from the bearings. As the shaft 8 rotates, the slinger 17 rotates with it, and directs oil outwards (that is, in a direction which has a radially-outward component), towards a drain 20. An oil system of the internal combustion engine may be configured to return the oil from the drain 20 to the oil inlet 18.

In use, the turbine wheel 4 is rotated about an axis 25 by the passage of exhaust gas from the exhaust gas inlet 9 to the exhaust gas outlet 10. Exhaust gas is provided to exhaust gas inlet 9 from an exhaust manifold (also referred to as an outlet manifold) of the engine (not shown) to which the turbocharger is attached. The turbine wheel 4 in turn rotates the compressor wheel 6 which thereby draws intake air through the compressor inlet 11 and delivers boost air to an inlet manifold of the engine via the volute 12 and then the outlet 13.

The compressor wheel 6 creates a low pressure region at its radially inward portion, and this has an undesirable tendency to draw oil from the bearing housing 3. Leakage of oil into the compressor is a key cause of failure. To impede the movement of oil in the axial direction towards the compressor 3, a baffle 21 is provided in the bearing housing. The baffle 21 has a central opening though which the shaft 8 and the slinger 17 are threaded. The baffle 21 has a frusto-conical formation which is co-axial with the rotation axis 25. The baffle 21 includes a "front" surface facing generally towards the turbine 1, and a rear surface facing towards the compressor 2. Although the slinger 17 directs some oil directly to the drain 20, the slinger 17 directs other oil against the front surface of the baffle, and the front surface of the baffle 21 guides this oil to the drain 20.

SUMMARY OF THE DISCLOSURE

The disclosure aims to provide a new and useful baffle element for the bearing chamber of a turbomachine, a seal system for the turbomachine comprising the baffle element, and a turbomachine such as a turbocharger including the seal system.

In a known turbocharger such as the one described above, there is a tendency for a body of oil, rotating in the same sense as the shaft, to form and persist on the front surface of the baffle (that is, the surface facing in the axial direction towards the turbine). This body of oil blocks the desired flow of oil back to the drain, and may cause oil leakage through a central aperture of the baffle towards the compressor.

Some rotational velocity of the body of oil is desirable, as this rotational velocity generates an outward force which pushes the body of oil away from the central opening of the baffle. However, if the rotational velocity of the oil is too high, then a percentage of the oil may bypass the drain and complete a second rotation, meaning that a greater volume of oil must be accommodated in the seal cavity. Additionally, a high rotational speed may lead to oil being forced to one side of the drain, reducing the drainage area being used and hence leading to less efficient drainage.

In general terms, the present disclosure proposes that the baffle element is formed with front surface (e.g. in the case of a turbocharger, a surface which faces towards a turbine end of the turbocharger shaft) including a recess which defines a circumferentially-extending oil-receiving channel, and an oil-deflecting surface on a gutter. The channel is circumferentially-extending in the sense that it extends further in the circumferential direction (i.e. around the rotational axis) than in the radial direction, preferably at least three times further, or at least 5 times further. Indeed, the channel may extend 360 degrees about the axis.

The channel decreases in cross-sectional area close to the oil-deflecting surface, and may indeed not exist at all at all angular positions about the central axis (e.g. not at angular positions proximate, e.g. in register with, the oil-deflecting surface). There is preferably a circular line centred on the axis which is within the channel distant from the gutter, and intersects with the oil-deflection surface. This forces the oil to change direction at the gutter (i.e., it converts circumferential velocity into axial velocity), and expels the oil from the baffle element. Thus, a high rotational velocity of the body of oil may be maintained, whilst improving the drainage efficiency of the seal system at the gutter.

One specific expression of the disclosure is a baffle element fora seal system of a turbomachine, the baffle element including:
  an inner portion defining a circular central opening which in use is positioned on a rotational axis of the turbomachine with a centre of the central opening on the axis and the perimeter of the central opening lying in a plane transverse to the axis;
  an outer portion encircling the inner portion; and
  a gutter extending radially-outwardly from the outer portion, and having an oil redirection surface inclined to the plane of the circular central opening;
  the baffle element having a front surface which in use faces axially into a bearing chamber, and a rear face which in use faces axially towards an oil seal plate,
  the front surface comprising a recess portion which is axially rearward with respect to portions of the front surface which are respectively radially-inward and radially-outward of the recess portion;
  the recess portion defining an circumferentially-extending oil reception channel which intercepts the oil redirection surface, whereby oil moving circumferentially in the channel encounters the oil redirection surface of the gutter and is deflected radially outwardly. The oil redirection surface preferably includes a portion which is recessed with respect to the circular central opening. The channel is generally deeper and/or wider at angular positions away from the oil-direction surface.

More precisely, the axial extent of the channel with respect to the circular central opening at a given angular position about axis of the circular central opening (i.e. the depth of the channel, e.g. as measured in the axial direction from the portion of front face of the baffle element immediately surrounding the circular central opening to the position on the front face which is within the recess at that angular position and furthest in the rearward axial direction from that portion of the front face) may vary from one angular position to another, and be greatest at a circumferential position about the axis which is circumferentially spaced from the gutter.

Alternatively or additionally, the channel may have varying cross-sectional area at different circumferential positions, the cross-sectional area at the different circumferential positions being measured as the intersection of the channel with respective planes including the axis, the cross-sectional area being greatest at a circumferential position about the axis which is circumferentially spaced from the gutter.

The channel may contain a part of a circle centred on the axis and which intercepts the oil deflection surface.

The recess portion of the front surface may for example have circular symmetry about the axis for a certain angular range about the axis (such as at least 120 degrees, at least 180 degrees, at least 220 degrees or even at least 270 degrees about the rotational axis). In this case, the recess portion of the front surface may include at least part of the circle (i.e. that part of the circle lies on the recess portion of the front surface).

The baffle element may be an integral (i.e. one-piece) member. It may be laminar (i.e. sheet-like, e.g. having a substantially constant thickness at all points on the front surface, including the gutter), but not necessarily flat (planar). It may for example be formed by folding a flat blank of uniform thickness.

The baffle element may be contacted and supported by an annular seal plate (e.g. an integral, i.e. one-piece, member), having a front surface facing towards the baffle element (e.g. towards the turbine wheel in the case of a turbocharger). In the case of a turbocharger, the rear face of the seal plate may face the compressor wheel. Connecting elements may be provided for mounting the baffle element on the seal plate. To aid alignment of the baffle and seal plate (particularly circumferentially), at least one slot may be formed on one of them (e.g. a front surface of the seal plate), and used during the assembly of the seal system by receiving a corresponding protrusion from the other (e.g. the baffle element). In the same way, to aid alignment of the seal plate and the bearing housing, at least one slot may be formed on one of the seal plate and the bearing housing, for receiving a protrusion from the other of the seal plate and the bearing housing.

The front surface of the seal plate is preferably not rotationally symmetric. It may comprise a support surface for contacting the rear surface of the baffle element, e.g. throughout an angular range of at least 120 degrees, at least 180 degrees, at least 220 degrees or even at least 270 degrees about the rotational axis. For example, the support surface may contact the rear surface of a wall of the baffle element which is formed radially-outward of the channel.

Within the axial range, the support surface, and optionally the wall of the baffle, may have circular symmetry about the axis. The support surface, and optionally the wall of the baffle, may, for example, be frustoconical with respect to the axis.

The seal system may comprise: a primary cavity, defined between a front surface of the baffle element and an element of which is fast with the bearing housing, such as a thrust bearing; and a secondary cavity, defined between a rear surface of the baffle element and a front surface of the seal plate.

The front surface of the seal plate further comprises a drain surface which is in circumferential register with the gutter of the baffle element, but which is further from the axis than the circularly-symmetric part of the support surface at the same axial position. This may permit spacing between the gutter and the seal plate, to permit oil to move from the secondary cavity to a drain of the turbomachine.

The position of the drain surface may also permit at least part of the gutter to be formed radially further from the axis than the wall at the same axial position. For example, it may permit at least part of the oil redirection surface of the gutter of the baffle element to be radially further from the axis than the front surface of the wall at a given axial position.

In this document the expression that a surface of an object "faces" in a certain direction (e.g. towards a second object) means that a normal direction to the surface, in the direction out of the object, has a positive component in the certain direction (e.g. moving from the object along the normal direction brings one closer to the second object, at least initially). Generally, the baffle element is at one axial end of the bearing chamber, and its front surface faces a central portion of the baffle chamber. In the case of a turbocharger, the front surface of the baffle element preferably faces along the axis of the turbocharger towards the turbine section of the turbocharger. Note that the normal direction to the front surface, at any given portion of the front surface, may be inclined to the rotational axis.

The term "inclined" is used in this document, when specifying that a surface is inclined to a given direction, to mean that the angle between the normal direction to the surface and the given direction is between 0 and 90 degrees but is not equal to 0 or 90 degrees. For example, the angle may be in a range from 10 to 80 degrees, or from 20 to 70 degrees. For example, it may be about 45 degrees.

BRIEF DESCRIPTION OF THE DRAWINGS

A non-limiting embodiment of the disclosure will now be described, for the sake of example only, with reference to the following figures, in which.

DETAILED DESCRIPTION OF THE EMBODIMENT

Figure 1:
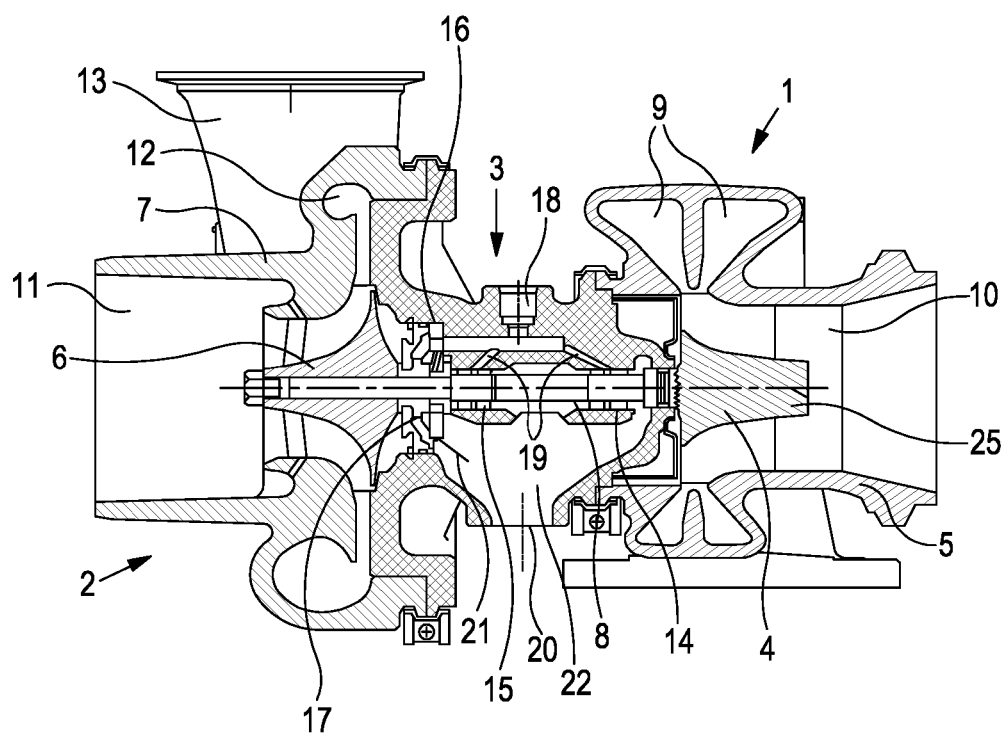
FIG. 1 is a cross-sectional drawing of a known turbocharger.
Figure 2:
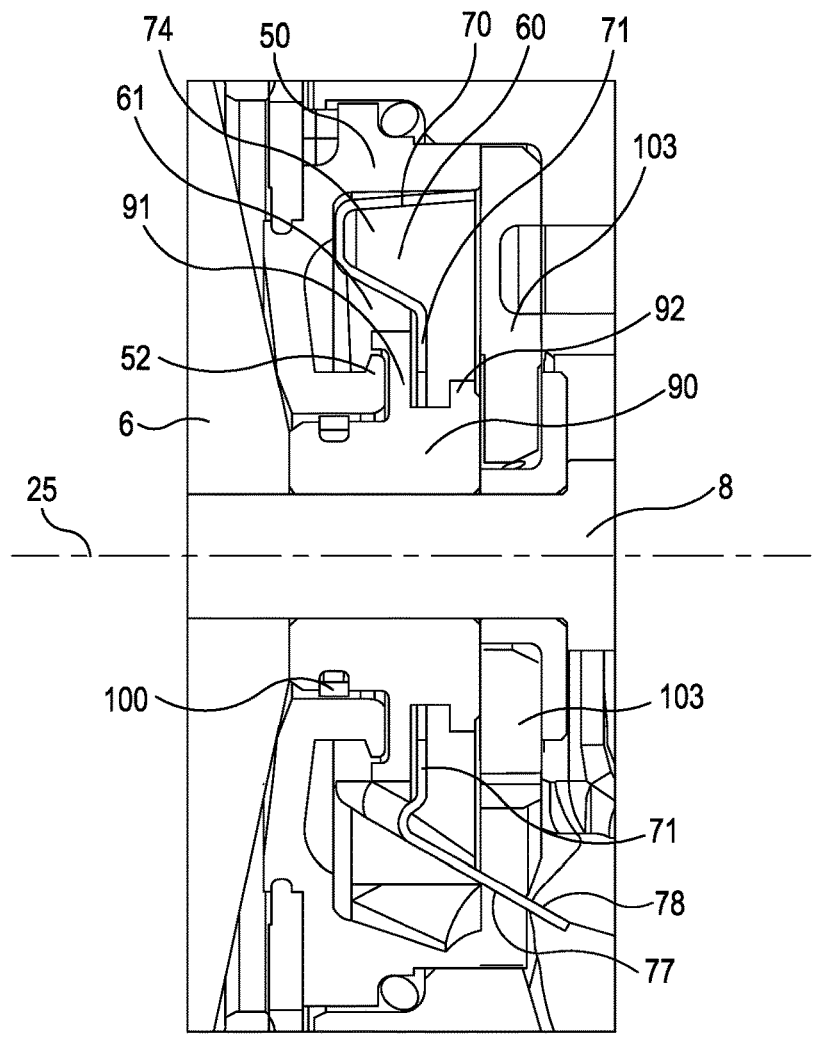
FIG. 2 is a cross-sectional view of a portion of a turbomachine which is an embodiment of the disclosure, the portion including a seal system.

Referring firstly to FIG. 2, a portion is shown of a turbomachine which is an embodiment of the present disclosure. The turbomachine may be a turbocharger which is identical to the known turbocharger shown in FIG. 1, except that the seal system which is provided between the bearing chamber 22 and the compressor wheel 6 takes the form explained in the following text, and illustrated with respect to FIGS. 2 to 5. In the following description, the term "front" refers to the direction to the right in FIG. 2, i.e. along the rotational axis towards the turbine wheel, while the term "rear" refers to the direction to the left in FIG. 2, i.e. along the rotational axis towards the compressor wheel.

The seal system comprises an oil seal plate 50 (described below in more detail with reference to FIG. 4), and a baffle element 70 (described below in more detail with reference to FIG. 5) which takes the place of the baffle 21 of FIG. 1. The oil seal plate 50 and baffle element 70 both define circular central openings centred on the axis 25, and the seal system comprises a slinger 90 (taking the place of the slinger 17 of FIG. 1) which is positioned within the central openings. The slinger 90 itself defines a central opening centred on the rotational axis 25, and the shaft 8 passes through the central opening of the slinger 90. A seal ring 100 may be positioned between the slinger 90 and the seal plate 50.

The baffle element has a radially inner portion 71 and a radially outer portion 72 (marked on FIG. 5(*e*)). On one side of the axis 25, the baffle element comprises a laminar gutter 77 inclined to the rotational axis 25. The front face of the gutter 77 is an oil-deflecting surface 78, which may be substantially flat (planar).

The seal system comprises a primary cavity 60 defined on the front surface of the baffle element 70. As illustrated, in this embodiment the primary cavity 60 is defined between the baffle element 70 and a thrust bearing 103. On the upper side of the axis 25 (as viewed in FIG. 2), the primary cavity 60 includes a channel 74 defined by a recess portion 73 of the front surface of the baffle element 70. The channel is thus recessed relative to (i.e. axially rearward of) the flat front surface of the inner portion 71 of the baffle which defines the circular central opening. Due to the channel 74 the axial width (i.e. the "depth") of the primary cavity 60 increases from the radial position of the inner portion 71 of the baffle element to the radial position of the channel 74, providing a large volume for oil collection.

The axial width, at any given circumferential position where the channel exists, may be defined as the distance the distance from the bottom of the recess (channel) to the flat front surface of the inner portion 71 of the baffle element. This axial width may alternatively be expressed as the distance d between the most axially-rearward part of the back surface of the baffle at the recess, and the flat back surface of the inner portion 71. The baffle element may have equal axial thickness at these points so these two expressions of the axial width are equivalent.

On the lower side of the axis 25, oil can escape from the primary cavity 60 to the drain by passing between baffle element 70 (i.e. the inner portion 71 and the gutter 77 of the baffle element) and the lower part of the thrust bearing 103.

The seal system further comprises a secondary cavity 61 defined between the seal plate 50 and the baffle element 70. On the lower side of the axis 25, oil can escape from the secondary cavity 61 to the drain by passing between the rear surface of gutter 77 and a drain surface 57.

The oil seal plate 50 comprises a radially-outwardly extending lip 52. The slinger 90 includes a radially-outwardly extending secondary fin 91 and radially-outwardly extending primary fin 92. The fins 91, 92 are circularly symmetric about the axis 25, as indeed is the entire radially-outer periphery of the slinger 90. The inner portion 71 of the baffle element 70 is substantially flat and laminar, the central opening of the baffle element 70 being defined by the circular radially-inner edge of the inner portion 71 of the baffle element 70. Note that the inner portion 71 of the baffle element 70 extends radially inwardly of the radially-outermost point of the secondary fin 91, thus limiting flow of oil from between the primary and secondary cavities 60, 61.

Figure 3:
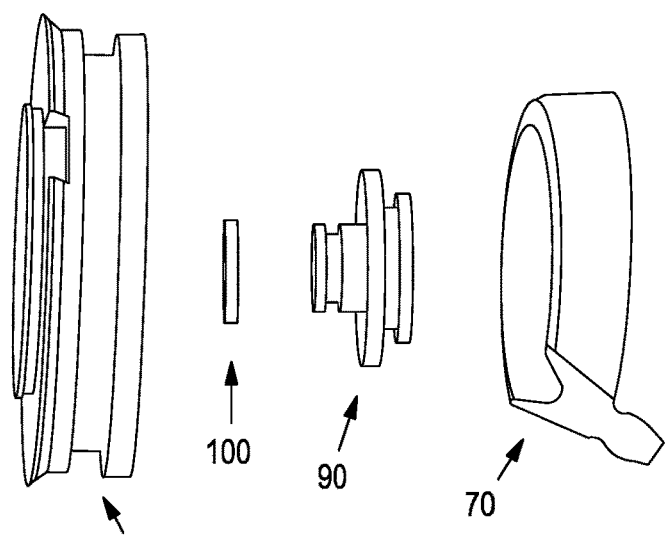
FIG. 3 is an exploded view of the portion of the turbomachine shown in FIG. 2.

FIG. 3 is an exploded view of the seal system comprising an oil seal plate 50, seal ring 100, slinger 90, and baffle element 70 according to the embodiment. The provision of the seal ring 100 allows for blow-by gas control in the event of gas leakage from the engine to which the turbocharger of FIG. 1 is coupled.

The inner diameter of the baffle element 70 (i.e., the diameter of the central opening) should be as small as possible, in order to reduce leakage through the central opening. The possible dimensions of the inner diameter will be limited by the clearance for the diameter of the primary fin 92, as the primary fin 92 passes through the central opening of the baffle element 70 during assembly.

Preferably, the diameter of the primary fin 92 is kept to a minimum value, as this allows for improved sealing performance. By minimising this diameter, a minimum amount of rotational energy is imparted to the oil as it leaves the slinger, and the circumferential velocity of the oil is reduced.

Figure 4A:
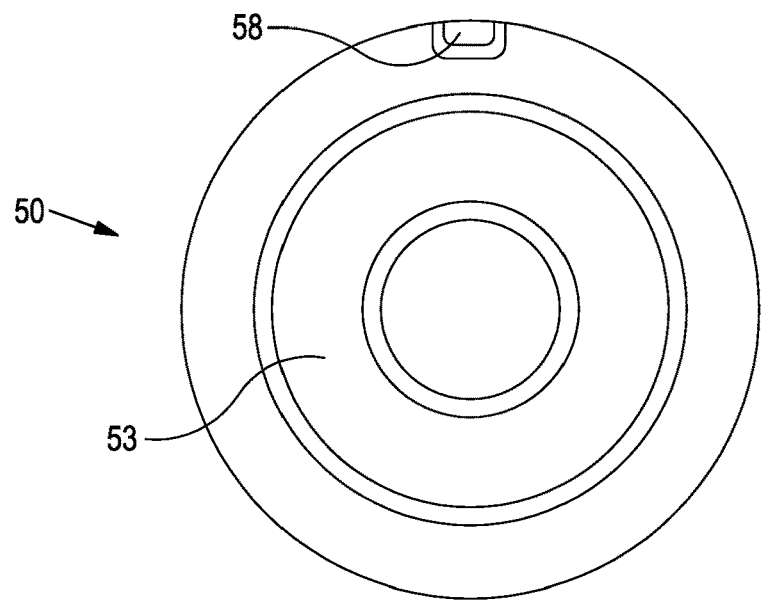
FIG. 4, which is composed of FIGS. 4(*a*) and 4(*b*), shows a seal plate of the seal system of the turbomachine of FIG. 2.
Figure 4B:
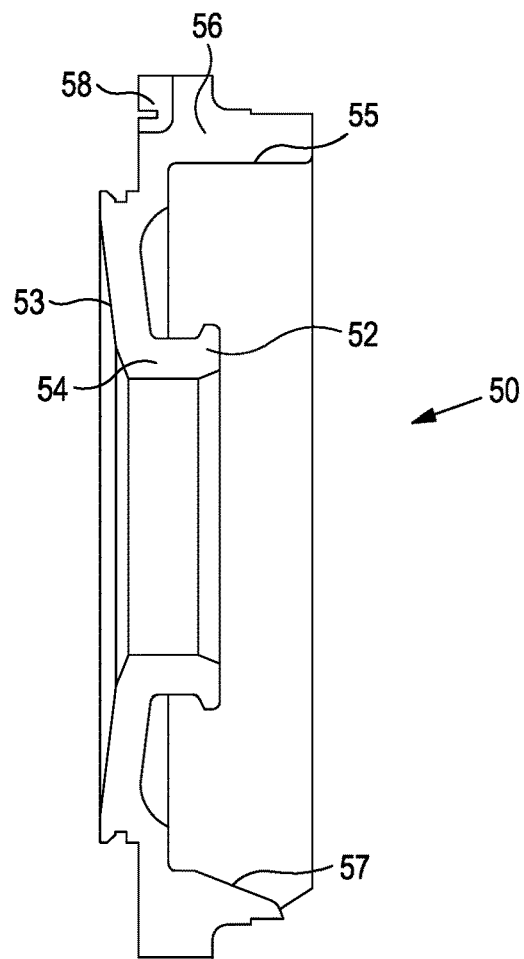

FIGS. 4(a) and 4(b) show plan and cross-sectional views of the oil seal plate 50 respectively. The view in FIG. 4(a) is how the oil seal plate 50 appears as viewed in the axial direction towards the turbine (i.e. the direction which is from the left in FIG. 2).

FIG. 4(a) shows the oil seal plate 50 having a slot 58 formed in its front surface 53. The slot 58 may be used to orient the oil seal plate 50 during a sub-assembly process in which the baffle element 70 and oil seal plate 50 are assembled. Subsequently, when the combination of the oil seal plate 50 and the baffle element 70 are inserted into the bearing housing 3, the slot 58 may also receive a corresponding protrusion from the bearing housing 3 to orient the combination of the baffle element 70 and oil seal plate 50 within the turbocharger. Note that in variations of the embodiment the oil seal plate 50 may additionally or alternatively be provided with a slot which is configured to engage with a corresponding protrusion in the baffle element 70 during assembly. This slot thus serves as an alignment feature which may be used to orientate the oil seal plate 50 with respect to the baffle element 70 and optionally the drain 20 of the turbocharger during assembly.

FIG. 4(b) shows a cross-sectional view of the oil seal plate 50. This is the same cross-section shown in FIG. 2.

As mentioned above, the front face of the oil seal plate 50 of the embodiment comprises a drain surface 57. The drain surface 57 is inclined with respect to the axis 25 of the turbocharger. The oil seal plate 50 may be produced by forging, and if so the drain surface 57 may be created in the forging process. The remainder of the oil seal plate 50 may be finish turned, leaving the drain surface 57 unchanged. Alternatively, the oil seal plate 50 could be manufactured by casting, or entirely by machining.

At a range of angles about the axis 25, the oil seal plate 50 comprises an outer wall 56, configured to engage with a rear surface of the oil seal plate 50. The inner surface of the outer wall 56 provides a support surface 55 for the baffle element 70. The support surface 55 may be circularly symmetric within an angular range of at least 180 degrees about the axis 25 of the turbocharger. Alternatively, the support surface 55 may be circularly symmetric within an angular range of at least 220 degrees about the axis 25 of the turbocharger.

For a given axial position, the support surface 55 is located closer to the axis than the drain surface 57. This makes it possible, when the support surface 55 is engaged with the rear surface of the baffle 70 (as in, for example, FIG. 2), as described above for a path to exist for oil to escape from the secondary cavity 61 between the drain surface 57 and the gutter 77 to the drain 20, even though the gutter 70 is further radially from the axis 25 than the outer wall 75 at that axial position.

In the exemplary embodiment, the oil seal plate 50 further comprises an inner wall 54, preventing oil from entering the central seal opening of the oil seal plate 50 and hence leaking to the compressor 2. The sealing performance of the oil seal plate 50 may be further enhanced by the provision of a radially-outwardly extending lip 52, as shown in FIG. 4(b).

Optionally, the radially-outer portion of the rear surface 53 of the oil seal plate may be axially further from the bearing chamber than the radially-inner portion. For example, the rear surface 53 of the oil seal plate 50 may be frusto-conical, in order to further reduce leakage to the compressor 2 via the central seal opening. Use of a frusto-conical rear surface 53 also serves to increase the size of the secondary cavity 61 defined between the rear surface of the baffle element 70 and the oil seal plate 50 (for a given axial position of the radially-inner part of the oil seal plate 50), allowing more oil to be accommodated within this secondary cavity 61.

Figure 5A:
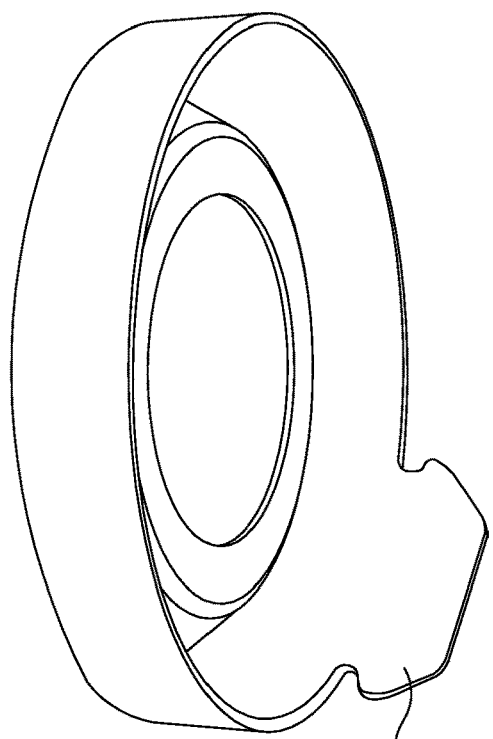
FIG. 5, which is composed of FIGS. 5(*a*)-5(*f*), shows a baffle element of the seal system of the turbomachine of FIG. 2.
Figure 5B:
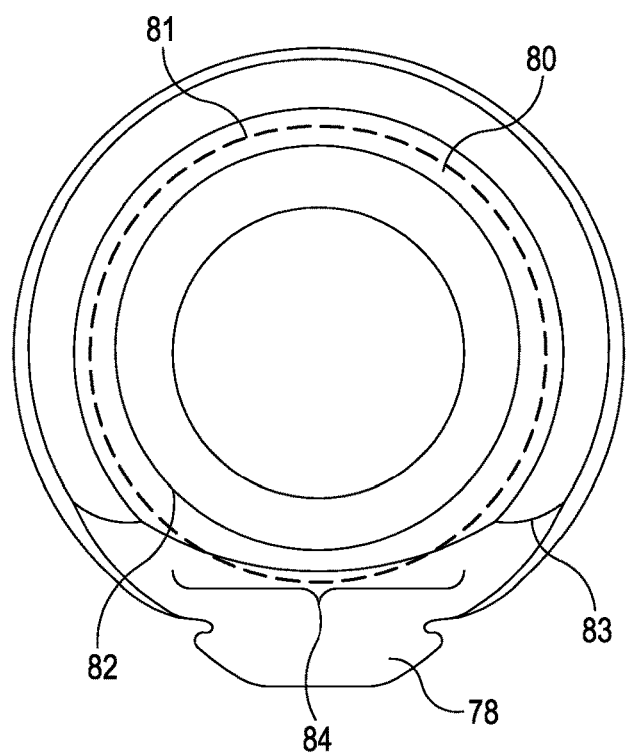

FIGS. 5(a)-5(f) show the baffle element 70. FIG. 5(a) is a perspective view of the baffle element 70, while FIG. 5(b) shows an axial view of the front surface of the baffle element 70 looking from the turbine end of the axis.

The baffle element 70 is formed without an aperture between its front and rear faces. This allows the baffle element 70 to more effectively contain and direct oil in the bearing housing (compared to certain baffles known in the prior art), since fewer leak paths exist between the primary and secondary cavities. In this document, the term 'aperture' means an opening having a closed (i.e. endless) boundary surface contained entirely within the element in which the aperture is formed.

FIG. 5(b) shows a circle 80 centred on the axis 25 and contained in the circumferentially-extending oil reception channel 74 (e.g. a circle which lies on the recess portion 73 of the front surface of the baffle element 70). At a first circumferential position 81, which is on the opposite side of the axis 25 from the gutter 77, the oil reception channel 74 has a first cross-sectional area as measured in a plane passing through the axis 25. In fact, the channel 74 has the same cross-sectional area at every angular position about the axis 25 within a range of angles which is centred at the position 81 and subtends at least about 220 degrees about the axis 220. Throughout this range of angles, the channel 74 is rotationally symmetric about the axis 25. At second circumferential positions 82, 83 the oil reception channel 74 has a second cross-sectional area. The second cross-sectional area is smaller than the first cross-sectional area. Thus, as oil moves circumferentially in the oil reception channel 74 towards the gutter 77, it is forced to change direction and expelled from the baffle element.

At either end of region 84, the circle 80 intersects the oil redirection surface 78 of the gutter 77. Within the region 84 the circle 80 is rearward of the oil redirection surface 78. Hence, oil moving along the circle 80 is expelled from the oil reception channel 74, urged onto the oil redirection surface 78, and directed the oil redirection surface 78 towards the drain 20 of the turbocharger.

Figure 5C:
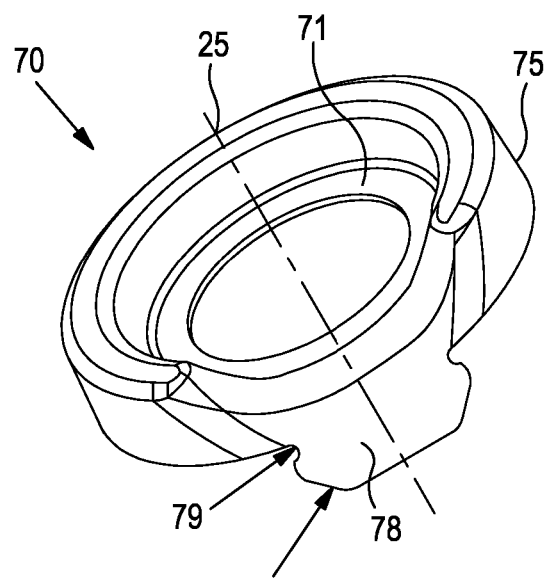

FIG. 5(c) shows a rear perspective view of an embodiment of the baffle element 70. The measurements included are exemplary and should not be taken as limiting the scope of the claims. The central opening of the baffle element 70 is centred on the rotational axis 25 of the turbine wheel 4 in use. To either side of the gutter 77, an indent 79 is located between the outer wall 75 and the gutter 77, facilitating bending of the gutter 77 from a flat laminar blank during manufacturing of the baffle element 70. The gutter 77 may be substantially laminar and flat.

Figure 5D:
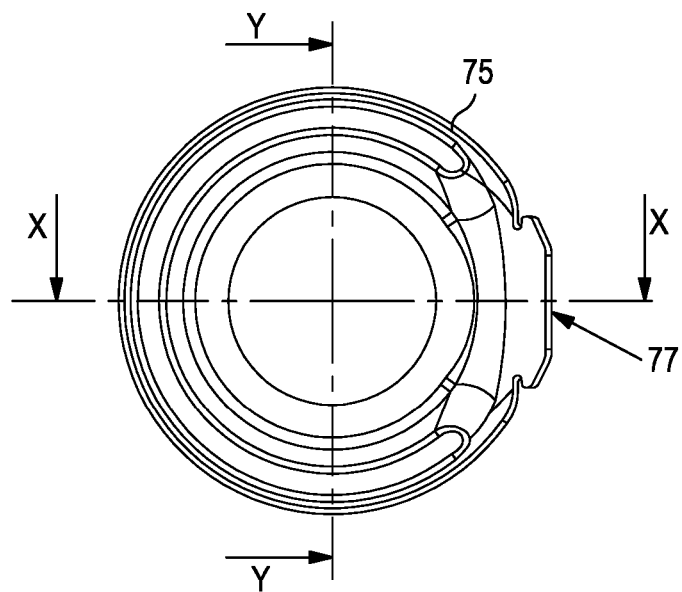

FIG. 5(d) is a plan view of the baffle element 70. The plane X-X shown intersects, on the left-hand side of FIG. 5(d), the portion 81 of the oil reception channel 74 having a first cross-sectional area, and, on the right-hand side of FIG. 5(d), the portion 84 of the oil reception channel 74 and the gutter 77. The plane Y-Y shown intersects two portions of the oil reception channel 74 having the first cross-sectional area.

Figure 5E:
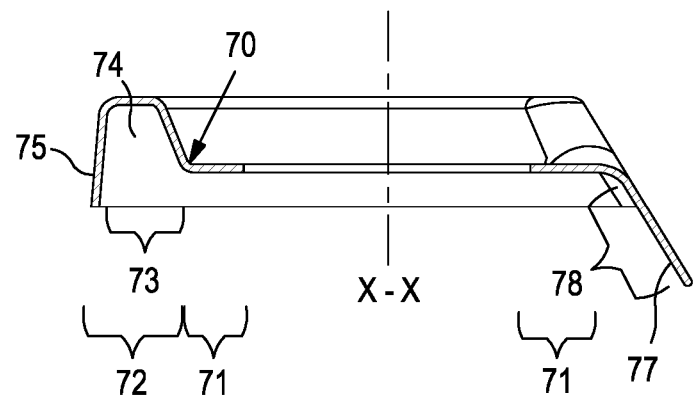

FIG. 5(e) is a cross-sectional view of the baffle element 70, viewed perpendicular to the plane X-X indicated in FIG. 5(d). The measurements included are exemplary and should not be taken as limiting the scope of the claims. A recess portion 73 of the front surface of the baffle element 70, is included in the outer portion 72 of the baffle element. The recess portion 73 of the front surface of the baffle element is axially rearward of both (i) a portion of the baffle element 70 which is radially inward of the recess portion 73 (i.e. the inner portion 71 of the baffle element 70), and (ii) a portion of the baffle element 70 which is radially outward of the recess portion 73 (i.e. the radially-outer part of the wall 75). The recess portion 73 defines the oil reception channel 74. It can be seen from FIG. 5(e) that the cross-sectional area of the oil reception channel 74 is reduced almost to zero on the right-hand side of the figure, at an angular position about the axis in circumferential register with the gutter 77. Indeed, in a variation of the embodiment, the recess portion 73 may not exist at that angular position. Preferably, the channel 74 extends to the gutter 77, and at circumferential positions which are circumferentially in register with the gutter the gutter 77 preferably provides a border (edge) of the channel 74.

Figure 5F:
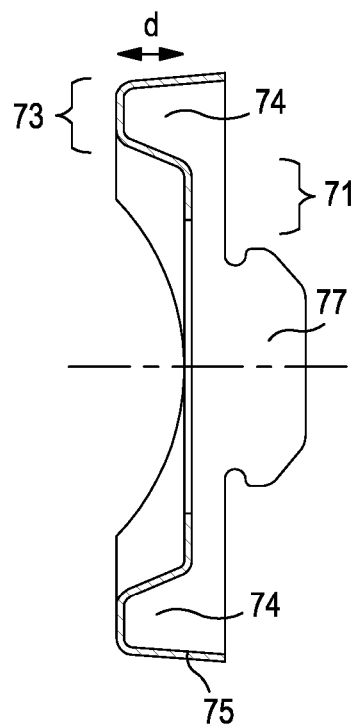

FIG. 5(f) is a cross-sectional view of the embodiment of FIG. 5(c), viewed perpendicular to the plane Y-Y indicated in FIG. 5(d).

Although only one embodiment of the baffle element and seal system has been described, many variations are possible within the scope of the disclosure as will be clear to a skilled reader. For example, the baffle element and seal system may be employed in a different sort of turbo-machine, such as one which does not include a turbine wheel, or one which does not include a compressor wheel.

The invention claimed is:

1. A baffle element for a seal system of a turbomachine, the baffle element including:
an inner portion defining a circular central opening which in use is positioned on a rotational axis of the turbomachine with a centre of the central opening on the axis and the perimeter of the central opening lying in a plane transverse to the axis;
an outer portion encircling the inner portion; and
a gutter extending radially-outwardly from the outer portion, and having a wall that coincidently defines a circumferential outer wall of the gutter and an oil redirection surface that is inclined to the plane of the circular central opening and the circumferential outer wall such that the baffle element inhibits formation of a rotating oil film on the forward-facing surface of the baffle, ensuring unobstructed oil flow to the drain and mitigating risk of oil leakage through the central opening and downstream of the baffle element;
the baffle element having a front surface which in use faces axially forwardly into a bearing chamber, and a rear face which in use faces axially rearwardly towards an oil seal plate,
the front surface comprising a recess portion which is axially rearward with respect to portions of the front surface which are respectively radially-inward and radially outward of the recess portion;
the recess portion defining a circumferentially-extending oil reception channel which intercepts the oil redirection surface, the channel having varying axial width at different circumferential positions, the axial width of the recess with respect to the circular central opening being greatest at a circumferential position about the axis which is circumferentially spaced from the gutter;
whereby in use oil moving circumferentially in the channel encounters the oil redirection surface of the gutter and is deflected radially outwardly to thereby perform at least one of converting the circumferential velocity into axial velocity and directing the oil towards a drain.

2. The baffle element of claim 1, the channel having varying cross-sectional area at different circumferential positions, the cross-sectional area at the different circumferential positions being measured as the intersection of the channel with respective planes including the axis, the cross-sectional area being greatest at a circumferential position about the axis which is circumferentially spaced from the gutter.

3. The baffle element of claim 1, in which the channel contains a circle centred on the axis which intercepts the oil redirection surface of the gutter.

4. The baffle element of claim 1, in which there is a circumferential position at which the cross-sectional area of the channel is greatest, and which is on the opposite side of the axis to the gutter.

5. The baffle element of claim 1, in which the outer portion of the baffle element includes a wall radially-outward of the channel and extending forward from the radially-outer edge of the recess portion, the wall including a portion which is opposite to a corresponding portion of the gutter with respect to the axis, and which is closer to the axis than the portion of the gutter.

6. The baffle element of claim 1, in which the gutter is formed without an aperture between the oil redirection surface and a rear surface of the gutter.

7. The baffle element of claim 1, in which the oil redirection surface is substantially flat.

8. The baffle element of claim 1, in which the inner portion is substantially flat and has an inner edge defining the circular opening.

9. The baffle element of claim 1, in which the recess portion extends to a circumferential position in circumferential register with the oil redirection surface.

10. The baffle element of claim 1, in which a portion of the front surface of the baffle element axially furthest in the rearward direction is on the opposite side of the axis from the gutter.

11. The baffle element of claim 1, wherein to at least one side of the gutter, an indent is located between the circumferential outer wall and the gutter, facilitating bending of the gutter from a flat laminar blank during manufacturing of the baffle element.

12. The baffle element of claim 11, wherein the at least one side is at either side of the gutter such that an indent is located at either between the circumferential outer wall and the gutter a t either side of the gutter, and wherein the gutter is substantially laminar and flat.

13. A seal system for a turbomachine, comprising a baffle element and an oil seal plate, the baffle element including:
an inner portion defining a circular central opening which in use is positioned on a rotational axis of the turbomachine with a center of the central opening on the axis and the perimeter of the central opening lying in a plane transverse to the axis;
an outer portion encircling the inner portion; and
a gutter extending radially-outwardly from the outer portion, and having a wall that coincidently defines a circumferential outer wall of the gutter and an oil redirection surface that is inclined to the plane of the circular central opening and the circumferential outer wall such that the baffle element inhibits formation of a rotating oil film on the forward-facing surface of the baffle, ensuring unobstructed oil flow to the drain and mitigating risk of oil leakage through the central opening and downstream of the baffle element;

the baffle element having a front surface which in use faces axially forwardly into a bearing chamber, and a rear face which in use faces axially rearwardly towards an oil seal plate, the front surface comprising a recess portion which is axially rearward with respect to portions of the front surface which are respectively radially inward and radially outward of the recess portion;

the recess portion defining a circumferentially-extending oil reception channel which intercepts the oil redirection surface, the channel having varying axial width at different circumferential positions, the axial width of the recess with respect to the circular central opening being greatest at a circumferential position about the axis which is circumferentially spaced from the gutter;

whereby in use oil moving circumferentially in the channel encounters the oil redirection surface of the gutter and is deflected radially outwardly to thereby perform at least one of converting the circumferential velocity into axial velocity and directing the oil towards a drain; and wherein the oil seal plate comprises:

an annular body defining a central seal opening which in use is positioned on a rotational axis of the turbomachine with a centre of the central seal opening on the axis;

the annular body having a front surface which in use faces towards the baffle element and the bearing chamber; and the front surface of the annular body comprising (i) a support surface for in use contacting the rear surface of the baffle element, and (ii) a drain surface which in use is in circumferential register with the gutter of the baffle element, and spaced from the rear surface of the baffle element, the drain surface being further from the axis than a corresponding portion of the support surface on the opposite side of the axis.

14. The seal system of claim 13, in which an oil containment chamber is defined between a portion of the oil seal plate and the rear surface of the baffle element.

15. The seal system of claim 13, wherein the drain surface is inclined to the axis.

16. The seal system of claim 13, wherein to at least one side of the gutter, an indent is located between the circumferential outer wall and the gutter, facilitating bending of the gutter from a flat laminar blank during manufacturing of the baffle element.

17. The seal system of claim 16, wherein the at least one side is at either side of the gutter such that an indent is located at either between the circumferential outer wall and the gutter a t either side of the gutter, and wherein the gutter is substantially laminar and flat.

18. A turbomachine, comprising:
a housing defining a bearing chamber;
a shaft having a longitudinal axis, a portion of the shaft being within the bearing chamber;
a plurality of bearing elements mounted on the housing within the bearing chamber, the bearing elements supporting the shaft, and permitting the shaft to rotate about the axis;
an oil delivery mechanism for supplying oil to the bearing elements;
a slinger element coupled to the shaft; and
a seal system at one axial end of the bearing chamber;
the seal system comprising a baffle element and an oil seal plate, the baffle element including:
an inner portion defining a circular central opening which in use is positioned on a rotational axis of the turbomachine with a centre of the central opening on the axis and the perimeter of the central opening lying in a plane transverse to the axis;
an outer portion encircling the inner portion; and
a gutter extending radially-outwardly from the outer portion, and having a wall that coincidently defines a circumferential outer wall of the gutter and an oil redirection surface that is inclined to the plane of the circular central opening and the circumferential outer wall such that the baffle element inhibits formation of a rotating oil film on the forward-facing surface of the baffle, ensuring unobstructed oil flow to the drain and mitigating risk of oil leakage through the central opening and downstream of the baffle element;
the baffle element having a front surface which in use faces axially forwardly into a bearing chamber, and a rear face which in use faces axially rearwardly towards the oil seal plate,
the front surface comprising a recess portion which is axially rearward with respect to portions of the front surface which are respectively radially inward and radially outward of the recess portion;
the recess portion defining a circumferentially-extending oil reception channel which intercepts the oil redirection surface, the channel having varying axial width at different circumferential positions, the axial width of the recess with respect to the circular central opening being greatest at a circumferential position about the axis which is circumferentially spaced from the gutter;
whereby in use oil moving circumferentially in the channel encounters the oil redirection surface of the gutter and is deflected radially outwardly to thereby perform at least one of converting the circumferential velocity into axial velocity and directing the oil towards a drain; and wherein the oil seal plate comprises:
an annular body defining a central seal opening which in use is positioned on a rotational axis of the turbomachine with a centre of the central seal opening on the axis;
the annular body having a front surface which in use faces towards the baffle element and the bearing chamber; and
the front surface of the annular body comprising (i) a support surface for in use contacting the rear surface of the baffle element, and (ii) a drain surface which in use is in circumferential register with the gutter of the baffle element, and spaced from the rear surface of the baffle element, the drain surface being further from the axis than a corresponding portion of the support surface on the opposite side of the axis.

19. The turbomachine of claim 18 which is a turbocharger.

20. The turbomachine of claim 18, wherein to at least one side of the gutter, an indent is located between the circumferential outer wall and the gutter, facilitating bending of the gutter from a flat laminar blank during manufacturing of the baffle element.

* * * * *